No. 665,933. Patented Jan. 15, 1901.
C. A. A. RAND.
HARVESTING MACHINE.
(Application filed Mar. 2, 1900.)
(No Model.) 2 Sheets—Sheet 1.

Witnesses:
W<sup>m</sup> A. Dreffein.
Chas. M. Chambers.

Inventor:
Charles A. Anderson Rand

No. 665,933. Patented Jan. 15, 1901.
C. A. A. RAND.
HARVESTING MACHINE.
(Application filed Mar. 2, 1900.)
(No Model.) 2 Sheets—Sheet 2.
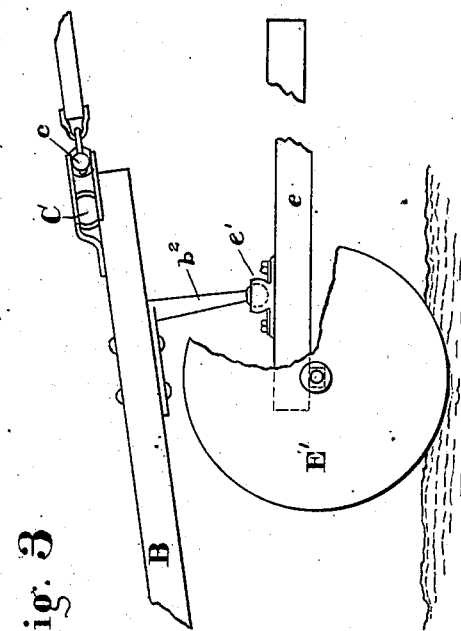
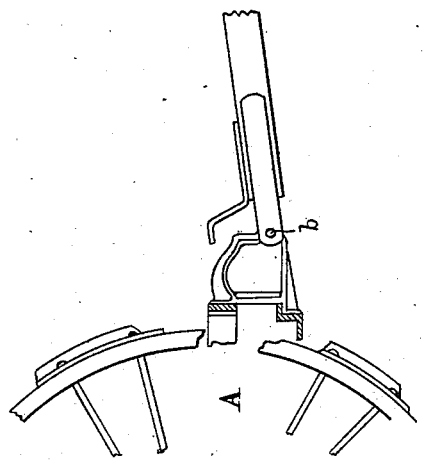

UNITED STATES PATENT OFFICE.

CHARLES A. ANDERSON RAND, OF CHICAGO, ILLINOIS.

HARVESTING-MACHINE.

SPECIFICATION forming part of Letters Patent No. 665,933, dated January 15, 1901.

Application filed March 2, 1900. Serial No. 7,074. (No model.)

*To all whom it may concern:*

Be it known that I, CHARLES A. ANDERSON RAND, of Chicago, in the county of Cook and State of Illinois, have invented certain new and useful Improvements in Harvesting-Machines, of which the following is a full description, reference being had to the accompanying drawings, in which—

Figure 1:
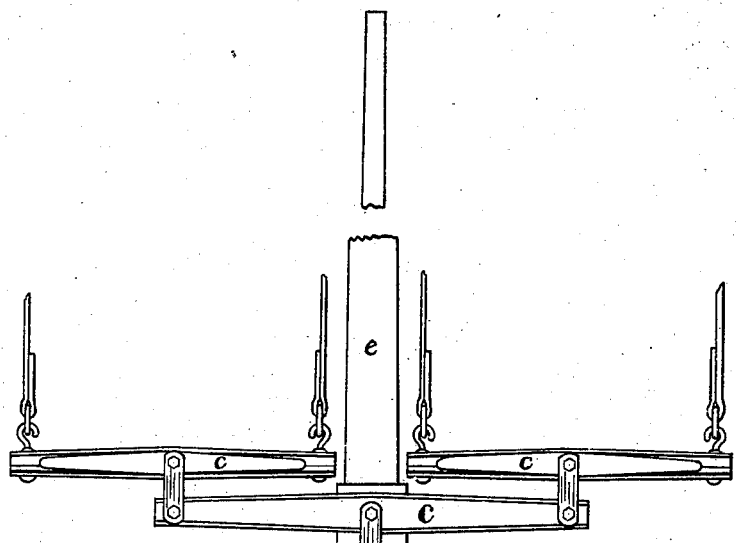
Figure 2:
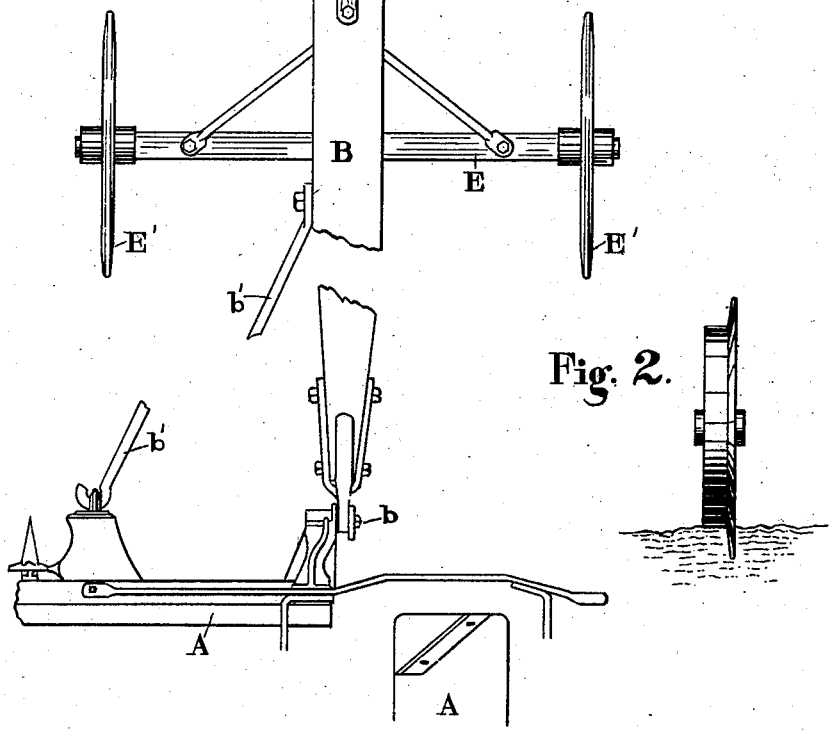

Figure 1 is a plan view of so much of the front portion of a self-binding harvester as necessary to show the draft-tongue in its proper position and the position of my improved tongue-truck relative thereto. Fig. 2 is a modified form of the disk-like wheels of the truck, and Fig. 3 is a side elevation of the parts shown in Fig. 1.

My invention is applicable to harvesting-machines that are drawn by a team and that have the cutting apparatus extending far grainward. In narrow-cut harvesting-machines it is not common to use a truck under the draft-tongue, but to sustain the tongue in the neck-yoke of the team. In these machines of narrow cut the side draft is not sufficient to work injury; but if the width of cut be increased to any great extent the side draft becomes so great as to render such wide-cut machines of no practical value. The result of excessive side draft has prevented the use of wide-cut harvesting-machines unless pushed before the team. In push-machines the team can be placed at such a position as to avoid side draft.

My invention consists in providing a truck having flanged or disk-like wheels, on which truck the tongue of the harvester rests, and the wheels of which by the preponderance of weight of the harvesting-machine forward of the main supporting-wheel will be forced to cut deeply into the ground, and thus resist the action of side draft, the truck being provided with a guiding-tongue supported in the neck-yoke of the team and the draft-devices of the machine being connected to the harvester-tongue. This will be understood by reference to Fig. 2. It is plain that with the wheel moving forward in a direct line any hanging back of the grain end of the machine can have no effect unless it tears up the soil into which the disks are cutting their path. It is found that an ordinary self-binding harvester of five feet width of cut, with its tongue in such a position upon the machine as to produce no side draft when supported in the neck-yoke, may have its cutting apparatus extended to a width of cut of twelve feet when my truck is applied.

In the drawings, A and A represent such portions of a self-binding harvester as necessary to understand my invention.

B is a strong short tongue pivoted thereto at *b*.

*b'* is the tongue-brace, suitably connected to the frame of the machine and to the tongue B.

The truck consists of an axle, a tongue, and the disks E' E', which serve as wheels.

The manner of connecting my truck will be understood from Fig. 3. The tongue B is no longer than necessary to connect the equalizers C and *c*. It is supported upon the truck in the following manner: Upon the truck-tongue *e*, near the axle, is the socket *e'*, and under the tongue is the down-reaching arm $b^2$, properly secured thereto. The parts $b^2$ and *e'* are preferably connected by a ball-and-socket joint, so that the truck may have freedom to vary its position in passing over uneven ground. The truck-tongue is supported at its forward end in the neck-yoke of the team; but the draft of the team is upon the tongue B.

In the modification Fig. 2 the disk-like wheel is shown to have a tread extending from the disk. This is for the purpose of preventing the disk from cutting unnecessarily deep into the ground.

What I claim as my invention, and desire to secure by Letters Patent, is—

In combination with a harvesting-machine, a tongue-truck provided with a disk-like wheel or wheels to prevent side draft, the tongue of the harvesting-machine being supported on said truck, the tongue of said truck supported in the neck-yoke of the draft-team, and draft devices connected to said harvesting-machine tongue, substantially as described.

CHARLES A. ANDERSON RAND.

Witnesses:
CHAS. M. CHAMBERS,
MARVIN CRAMER.